Figure 3:
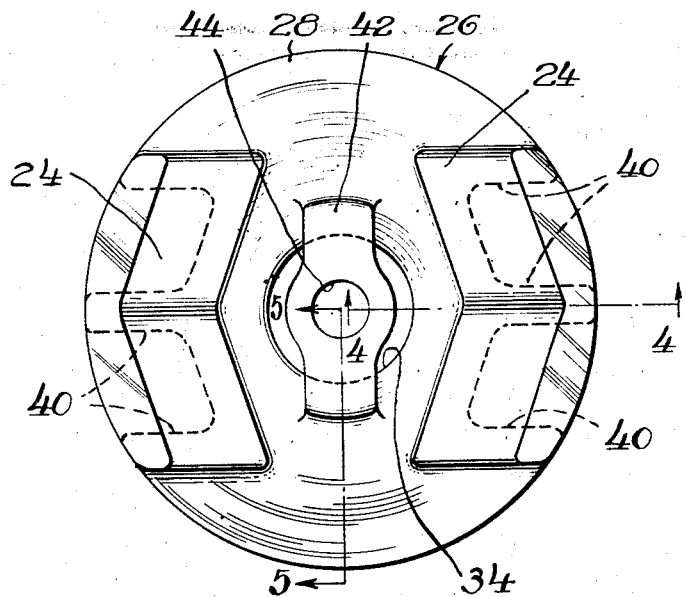

Sept. 18, 1945.  D. M. LIGHT  2,385,009
SNUBBER
Filed Sept. 25, 1942  2 Sheets-Sheet 1
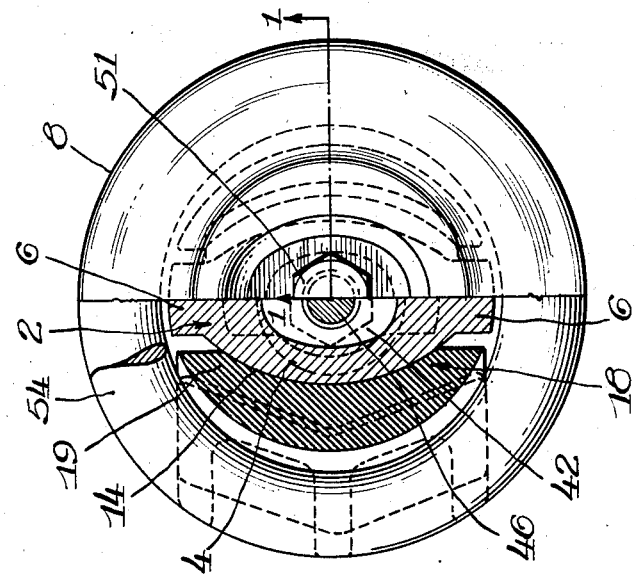
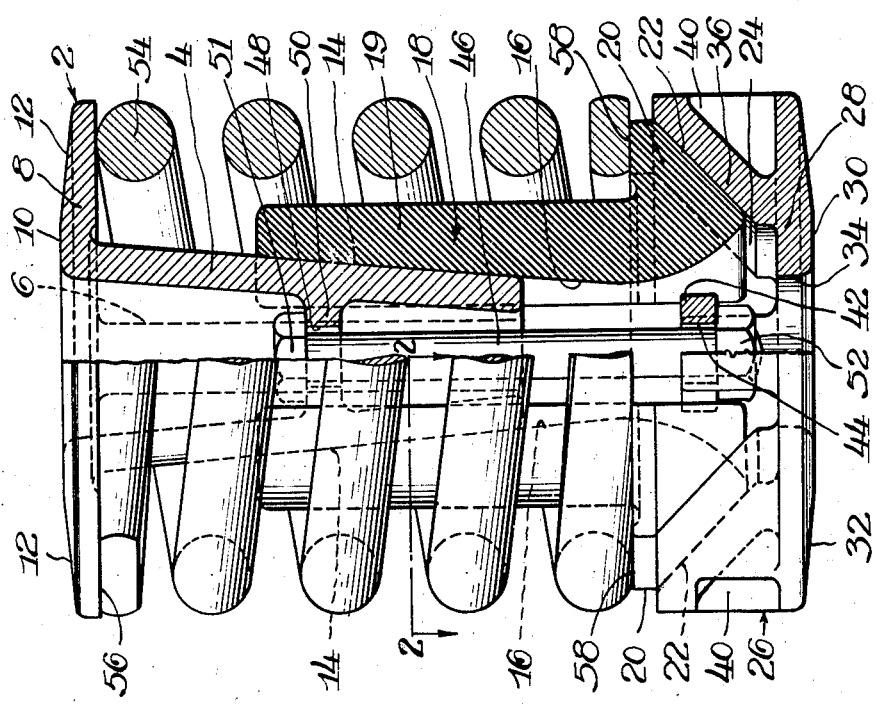
INVENTOR.
David M. Light
BY
[signature] Atty.

Sept. 18, 1945.   D. M. LIGHT   2,385,009
SNUBBER
Filed Sept. 25, 1942   2 Sheets-Sheet 2

INVENTOR.
David M. Light
BY
Atty.

Patented Sept. 18, 1945

2,385,009

UNITED STATES PATENT OFFICE 2,385,009

SNUBBER

David M. Light, Chicago, Ill., assignor to American Steel Foundries, Chicago, Ill., a corporation of New Jersey Application September 25, 1942, Serial No. 459,652

12 Claims. (Cl. 267—9)

My invention relates to friction absorbing devices and more particularly to such a device commonly known as a snubber and associated with a group of coil springs affording support from a side frame for an associated bolster of a railway car truck, the snubber being designed to substantially eliminate synchronous vibrations or oscillations of the springs constituting said coil spring group.

A general object of my invention is to design a snubber having relatively few parts and capable of long life in service. My snubber is of such form that it may be conveniently substituted for one of the springs in the above-mentioned spring group.

A specific object of my invention is to design a snubber in which a pair of friction shoes are sleeved within an associated coil spring and are frictionally engaged with a pair of spaced followers, said spring being seated against one of the followers and against spring seats formed on said shoes.

A further object of my invention is to design a novel means for retaining the snubber in assembly on the release stroke thereof, said means comprising a bridge member formed on one of the followers intermediate the friction surfaces thereon and comprising an opening for the reception of an associated securing bolt, said bolt extending into a hollow friction stem on the other follower and being engaged with a transverse web integrally formed within said stem.

My invention comprehends a friction follower of novel form, said follower comprising an annular plate-like base affording a seat for one end of the snubber and having a plurality of oppositely disposed elevated friction surfaces on said base and an opening centrally thereof and intermediate said friction surfaces, said follower also comprising a bridge member extending across said opening and having a passage aligned therewith and formed and arranged for the reception of an associated securing bolt.

My invention also comprehends another friction follower of novel form, said follower comprising a hollow friction stem with an internal transverse web comprising an opening therethrough for the reception of the opposite end of the above-mentioned bolt, said stem being formed with an annular flange affording a seat for the associated end of the snubber as well as a seat for the associated end of the coil spring utilized in the design.

My invention also comprehends spaced identical friction shoes of novel form, each of said shoes being formed with an arcuate wall comprising a diagonal friction surface on one side thereof and being formed with a ledge at one end thereof, said ledge also comprising a diagonal friction surface and affording a spring seat on the opposite side of said wall.

In the drawings, Figure 1 is a side view of my novel snubber, the left half thereof being a view in elevation and the right half thereof being a view taken substantially in the vertical plane indicated by the line 1—1 of Figure 2. Figure 2 is a top view of the structure shown in Figure 1, the right half thereof being a plan view and the left half being a sectional view taken substantially in the plane indicated by the line 2—2 of Figure 1.

Figure 4:
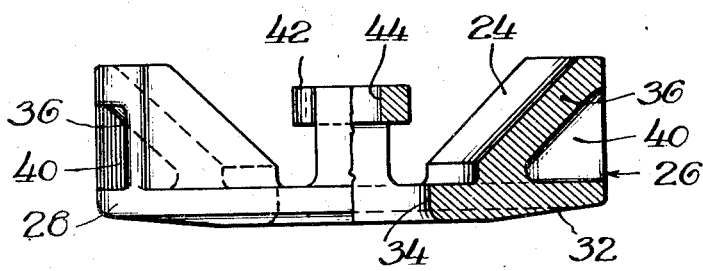
Figure 5:
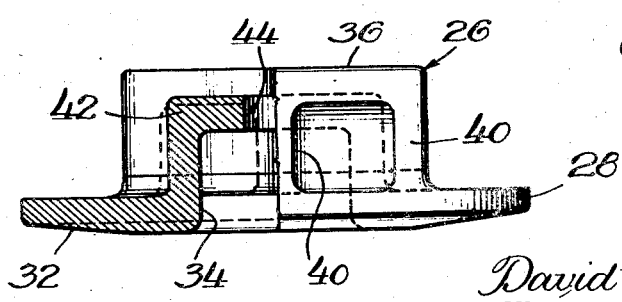

Figures 3 to 5 inclusive show in detail one of the friction followers utilized in my novel arrangement, said follower being here shown as a bottom follower, Figure 3 being a top plan view thereof, Figure 4 being a side view taken from the bottom as seen in Figure 3, the left half thereof being a view in elevation and the right half thereof being a sectional view in the plane indicated by the line 4—4 of Figure 3, and Figure 5 being a side view taken from the right as seen in Figure 3, the right half thereof being a view in elevation and the left half thereof being a sectional view taken substantially in the plane indicated by the line 5—5 of Figure 3.

Describing my invention in detail, the top follower, generally designated 2, comprises the hollow friction stem 4 comprising at opposite sides thereof the diagonal arcuate exterior friction surfaces for engagement with the associated friction shoes in a manner hereinafter more fully described, and said stem is formed at opposite edges thereof with the substantially vertical ribs 6, 6 serving as reinforcing means for the stem 4 and also as positioning means with respect to the coil spring sleeved thereover as hereinafter more fully described. The stem 4 is formed with an annular substantially horizontally disposed flange 8, said flange affording a seat as at 10 (Figure 1) for an associated supported member and being tapered at 12 in order to accommodate rocking movement of said member as will be readily understood by those skilled in the art. The friction stem 4, as before mentioned, comprises at opposite sides thereof arcuate diagonal friction surfaces in complementary frictional engagement as at 14, 14 with the friction surfaces 16, 16 (Figure 1) formed on the respective friction shoes generally designated 18, 18, each shoe comprising an arcuate wall 19 of tapering section with the thickest section at the lower end thereof being formed with a ledge 20 in diagonal V-shaped frictional engagement at 22 with a complementary friction surface 24 formed on the bottom follower generally designated 26. The bottom follower 26 is formed with the plate-like annular base 28 affording a seat as at 30 (Figure 1) for the snubber upon an associated supporting member as will be clearly apparent to those skilled in the art, said base being tapered at 32 to afford a rocking movement of the snubber on the seat 30. Centrally thereof the base 28 is formed with the opening 34 formed and arranged for the reception of positioning means on the associated supporting member in the usual manner. In this connection it may be noted that the top follower 2 affords similar positioning means by means of the central opening defined by the annular flange 8. At diametrically opposite sides of the base 28 the bottom follower 26 is formed with the diagonal V-shaped friction surfaces 24, 24 formed on the friction walls 36, 36 (Figure 4), each of said walls 36, 36 being reinforced by a plurality of vertical legs 40, 40 integrally formed therewith and with the base 28.

Spanning the opening 34 in said base is a bridge member 42 comprising the opening 44 aligned with the opening 34 and formed and arranged for the reception of a securing bolt 46 extending upwardly within the hollow stem 4 and through the opening 48 (Figure 1) in the transverse substantially horizontal wall 50 integrally formed within the stem 4, the head 51 of said bolt being seated against the wall 50 and a nut 52 being threaded on the lower end of the bolt and engaged with the lower surface of the bridge 42 on the release stroke of the snubber.

It will be clearly understood by those skilled in the art that by means of the above-described arrangement the followers 2 and 26 may be afforded movement toward and away from each other, said movement being limited on the release stroke in order to maintain the snubber in assembled relationship during bouncing movement of the associated bolster such as may readily occur in service.

A compression spring 54, here shown as a coiled spring, is sleeved over the friction shoes 18, 18 and the friction stem 4 is seated at the upper end thereof as at 55 (Figure 1) against the flange 8 on the stem 4, said spring 54 being seated at 58 at the lower end thereof on appropriate spring seats formed on the ledges 20, 20 of the respective friction shoes 18, 18.

It will be readily understood by those skilled in the art that although I have herein described the follower 2 as a top follower and the follower 26 as a bottom follower, the snubber might be inverted with the followers 26 and 2 being disposed respectively as the top and bottom followers of the device, and it will be further understood that, if desired, the frictional engagement between the stem 4 and the friction shoes 18, 18 at 14, 14 may be along a substantially vertical surface in order to obtain uniform friction absorption on the compression and release strokes, the modification shown herein illustrating a diagonal frictional engagement at 14 in order to provide a greater friction absorption on the compression stroke than on the release stroke. An important feature of my novel arrangement resides in the fact that, due to the formation of the arcuate surfaces on the wall 19 of each friction shoe, the wall has an arcuate cross section defined by approximately equal inner and outer radii thus affording a relatively thick shoe with great strength and depth of cross section to accommodate wear thereof. This feature is particularly well illustrated in the sectional view through the shoe in Figures 1 and 2.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a friction absorbing device, a follower having a base and a hollow friction stem projecting therefrom, a transverse web formed within said stem and having an opening therethrough, a spaced follower having a base with oppositely disposed diagonal friction faces at opposite sides thereof, a bridge member integrally formed with the last-mentioned base and having an opening aligned with the first-mentioned opening, spaced friction shoes in engagement with exterior surfaces of said friction stem and in complementary engagement with respective faces, a coil spring sleeved over said shoes and seated thereagainst and against the base of said first-mentioned follower, and a rigid retaining member extending between said shoes, slidably extending through said aligned openings, and provided with abutment means for cooperation with said web and said bridge to retain the device in assembly on the release stroke thereof, said friction stem being provided with oppositely disposed external spring positioning ribs interposed between the surfaces thereon in engagement with said shoes.

2. In a friction absorbing device, a top follower comprising a base and a hollow friction stem depending therefrom, a transverse web formed within said stem and having an opening therethrough, a bottom follower having a base with oppositely disposed diagonal friction faces at opposite sides thereof, a bridge member integrally formed with the last-mentioned base and having an opening aligned with the first-mentioned opening, spaced friction shoes in complementary arcuate face engagement with the exterior surface of said friction stem and in complementary engagement with respective faces, a coil spring sleeved over said shoes and seated thereagainst and against the base of said top follower, said stem being provided with substantially vertical ribs intermediate said shoes and affording positioning means for said spring, and a retaining bolt extending between said shoes, slidably extending through said aligned openings, and provided with means for abutment with said web and said bridge to retain the device in assembly on the release stroke thereof.

3. In a friction absorbing device, a top follower comprising a base and a hollow tapering friction stem depending therefrom, a transverse web formed within said stem and having an opening therethrough, a bottom follower having a base with oppositely disposed diagonal V-shaped friction faces at opposite sides thereof, a bridge member integrally formed with the last-mentioned base and having an opening aligned with the first-mentioned opening, spaced friction shoes in complementary engagement with exterior surfaces of said friction stem and in complementary engagement with respective faces, a coil spring sleeved over said shoes and seated thereagainst and against the base of said top follower, spring guide means on said stem, and a retaining bolt extending between said shoes, through said aligned openings, and provided with means for abutment with said web and said bridge to retain the device in assembly on the release stroke thereof.

4. In a friction absorbing device, a follower having a base and a hollow friction stem projecting therefrom, a transverse web formed within said stem and having an opening therethrough, a spaced follower having a base with oppositely disposed diagonal friction faces at opposite sides thereof, a bridge member integrally formed with the last-mentioned base and having an opening aligned with the first-mentioned opening, spaced friction shoes in engagement with exterior surfaces of said friction stem and in complementary engagement with respective faces, a coil spring sleeved over said shoes and seated thereagainst and against the base of said first-mentioned follower, aligned guide means at opposite sides of said stem for said spring, and a rigid retaining member extending between said shoes, slidably extending through said aligned openings, and provided with abutment means for cooperation with said web and said bridge to retain the device in assembly on the release stroke thereof.

5. In a friction absorbing device, a top follower comprising a base and a hollow tapering friction stem depending therefrom, a transverse web formed within said stem and having an opening therethrough, a bottom follower having a base with oppositely disposed diagonal V-shaped friction faces at opposite sides thereof, a bridge member integrally formed with the last-mentioned base and having an opening aligned with the first-mentioned opening, spaced friction shoes in complementary engagement with exterior surfaces of said friction stem and in complementary engagement with respective faces, a coil spring sleeved over said shoes and seated thereagainst and against the base of said top follower, aligned spring guide means at opposite sides of said stem intermediate said shoes, and a retaining bolt extending between said shoes, through said aligned openings, and provided with means for abutment with said web and said bridge to retain the device in assembly on the release stroke thereof.

6. In a friction absorbing device, a follower comprising a base with diagonal friction surfaces at opposite sides thereof, friction shoes in complementary engagement with respective surfaces, a spaced follower having a hollow friction stem extending between and frictionally engaged with said shoes, resilient means engaged with said shoes and said spaced follower for yieldingly resisting frictional movement therebetween, vertical guides on said stem intermediate said shoes for said resilient means, and retaining means comprising a rigid member slidably engaged with the first-mentioned follower and extending into said stem for slidable engagement therewith, said rigid member having abutment means cooperating with means on the respective followers to maintain the device in assembled relationship by limiting movement of said followers away from each other.

7. In a friction absorbing device, a follower comprising a base with elevated diagonal V-shaped friction surfaces at opposite sides thereof, spaced friction shoes in complementary engagement with respective surfaces, a spaced follower having a friction stem extending between said shoes and frictionally engaged with a wall of each shoe, and resilient means engaged with said shoes and said spaced follower for yieldingly resisting frictional movement therebetween, each of said walls having an arcuate cross section defined by approximately equal inner and outer radii.

8. In a friction absorbing device, a follower comprising a base with elevated diagonal friction surfaces at opposite sides thereof, friction shoes in complementary engagement with said surfaces, a member having a friction stem extending between said shoes and frictionally engaged with a wall of each shoe, and a coil spring sleeved over said shoes and engaged at opposite ends thereof with said shoes and said member, each of said walls having an arcuate cross section defined by approximately equal inner and outer radii.

9. In a friction shoe, a solid metallic member comprising an arcuate wall having a diagonal friction surface on one side thereof and a ledge on one end thereof comprising a diagonal V-shaped friction surface, and a spring seat on said ledge at the opposite side of said wall, said diagonal surface being struck from a radius at least as great as the radius defined by the outer circumference of said wall.

10. In a friction shoe, a substantially solid metallic member comprising an arcuate wall having a diagonal friction surface on one side thereof and a ledge on one end thereof comprising a diagonal V-shaped friction surface, and a spring seat on said ledge at the opposite side of said wall, the inner and outer surfaces of said wall being defined by approximately equal radii.

11. In a friction shoe, a substantially solid metallic member comprising an upright wall integrally formed with a diagonal frictional base underlying a horizontal ledge affording a seat for an associated spring, said wall having an arcuate section defined by approximately equal inner and outer radii.

12. In a friction shoe, a substantially solid metallic member comprising an upright wall integrally formed with a diagonal frictional base underlying a horizontal ledge affording a seat for an associated spring, said wall having an arcuate section defined by approximately equal inner and outer radii, one face of said wall being substantially vertical and the other face thereof diagonally arranged.

DAVID M. LIGHT.